Figure 1:
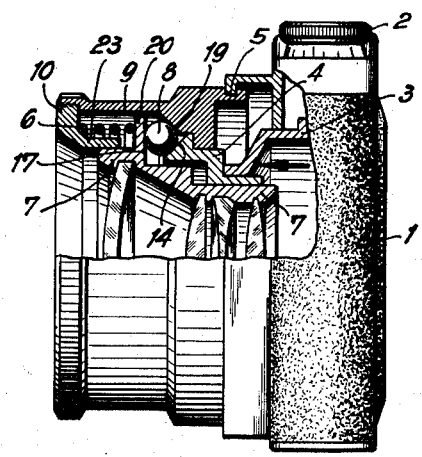

Oct. 21, 1958   A. MEIXNER ET AL   2,856,830
CAMERA FOCUS ADJUSTING MECHANISM
Filed July 10, 1953

INVENTORS
ALFRED MEIXNER
RICHARD SOMMER

Mock + Blum

ATTORNEYS

United States Patent Office 2,856,830
Patented Oct. 21, 1958

2,856,830

CAMERA FOCUS ADJUSTING MECHANISM

Alfred Meixner and Richard Sommer, Braunschweig, Germany, assignors to Voigtlander, A. G., Braunschweig, Germany, a corporation of Germany Application July 10, 1953, Serial No. 367,288

Claims priority, application Germany November 6, 1952

1 Claim. (Cl. 95—45)

This invention relates to a device for the adjustment of parts of optical devices and has particular relation to a device for the adjustment of exchangeable objectives in photographic cameras.

It has been known to adjust parts of optical devices, for example, exchangeable objectives of photographic tube cameras, in such manner that a drive member which is adapted to move over a relatively long path, e. g. a rotary knob, causes displacement of the part to be adjusted over a distance which is relatively short in comparison with said path.

In effecting such adjustment, suitable transmission elements, such as toothed wheels, angle levers having unequal arms, and the like, have been inserted between the drive member and the part to be adjusted.

It has also been known to cause displacements of varying lengths of parts to be adjusted, at equal movements of the drive member by changing the transmission ratio. For example, in the use of conventional exchangeable objectives of different focal lengths, which can be attached to photographic cameras, by equal movements of a drive member, e. g. the adjusting knob of the range finder, different displacements can be brought about by providing each individual exchangeable objective with slots or attached eccentrics of a different pitch, which coact with a guide pin moved always over the same distance by the drive member.

The above mentioned means or devices have often dimensions which require the increase of dimensions of cameras or camera parts or have parts which are subjected to undue tear and wear owing to friction, and/or inaccuracies resulting from easy exchangeability, so that the exactness of adjustment is adversely affected and the production costs become relatively high.

The main object of the present invention is to provide a novel device for the adjustment of parts of optical devices, particularly of exchangeable objectives of photographic cameras. Equal movements of a drive member can likewise bring about displacements of different lengths, by changing the transmission ratio, but the above mentioned difficulties and disadvantages of the known devices are substantially reduced or eliminated in this new device.

Another object of the present invention is to provide a device of the before mentioned type which has relatively small dimensions, can be completely built-in in optical devices or apparatus, is distinguished by low friction and easy running and consists of a few simple parts which can be easily manufactured.

In the device according to the present invention, the gear causing transmission of the driving movement, consists of one stationary element and two parts movable relative to said element, one surface of each of said element and parts forming together a triangle-shaped bearing containing balls or rollers. In said bearing, movement of one of the movable parts, derived from the drive member, forces the balls or rollers into a wedgeshaped gap between said stationary part and the other of the movable parts, whereby the latter is subjected to a certain displacement. The part thus displaced may be the element to be adjusted, or an element which transmits its movement to the element to be adjusted.

The surfaces which inclose the balls or rollers and are in contact with the same, are preferably arranged in such manner that the surface engaging the ball or roller, of the element carrying out the desired displacement, is perpendicular to the direction of displacement so that the pressure of the ball or roller on said part acts in the direction of displacement.

The effect of transmission, i. e. the resulting displacement, depends on the incline or pitch ratio within the triangle-shaped ball or roller bearing which has a wedgelike effect. This ratio is determined by the mutual inclinations of the surfaces engaging the balls or rollers, relative to each other. If the inclination of at least one of the engaging surfaces is changed, a different transmission and, correspondingly, a different displacement will result. Thus, it is possible to obtain a different displacement by substituting for at least one part another part having a different inclination of surface.

In addition to the possibility of changing the displacement of a part to be adjusted by substitution of individual gear parts having different inclination of surfaces, the device according to the invention can be constructed also in such manner that an aggregate of elements to be displaced, which is supposed to carry out always the same predetermined displacement, contains an unchangeable transmission gear according to the invention, i. e. forms a structural unit with said aggregate.

This embodiment is of importance when such aggregates, e. g. exchangeable objectives, are adapted to be attached to an optical device and should be exchangeable for one another. In such case, the optical device is provided with a drive member which is moved always by the same amount, for producing any desired displacement. Each attachable aggregate is thereby subjected to the same drive movement, after its coupling with the optical device and obtains its proper displacement by the unchangeable transmission included in the aggregate.

In general, the parts forming the transmission system used in carrying out the invention, are manufactured in such manner that they yield directly exact transmissions, i. e., exactly the desired displacements. However, additionally such parts can be adjustable, for example in order to compensate for manufacturing tolerances or for the play of couplings, or the like. In order to attain this, one or more of the surfaces contacting the balls or rollers may be capable of swinging, displacement or may be otherwise adjustable.

In applying the present invention to exchangeable photographic objectives, for which the device according to the invention is particularly suitable in view of its small dimensions and easy running, various embodiments can be used. For example, a tube which is provided with an interior ring surface inclined relative to the optical axis, may contain a lens carrier journalled therein, which is displaceable in the tube and is elastically held relative to the camera, said carrier having an exterior flange which is perpendicular to the optical axis. Thereby, this flange forms with the inclined ring surface of the tube a wedge-shaped groove or keyway of predetermined inclination, which is adjustable in its width. At the entrance of the wedge-shaped groove balls are arranged which are held by the bevelled front surface of a tube-shaped slide which is displaceable on the lens carrier or in the tube, and are then forced into the wedgeshaped groove when the slide is caused to be displaced by the drive member, for example a rotary knob.

From the driving members serving for effecting displacements, for example from the beforementioned slide for displacing the balls or the threaded ring, movements of other members, particularly the adjustment of rangefinders, can be derived.

The appended drawing illustrates an embodiment of the invention, to which the invention is not limited. Elements which do not form part of the invention and are not necessary for understanding the same, have not been shown in the drawing.

Figure 2:
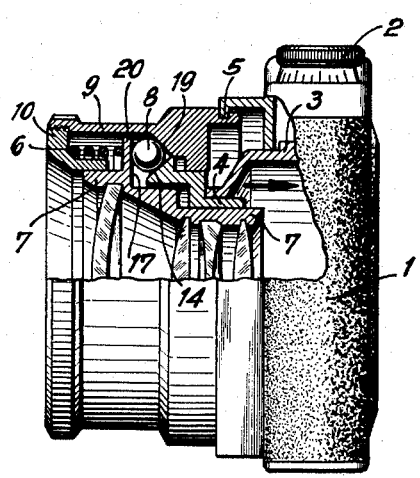

In the drawings, Figure 1 illustrates, partly in section, a camera provided with an exchangable objective, in the infinite position and the drive for displacement of the objective; Figure 2 is similar to Figure 1, but shows the objective adjusted to a near object.

Referring now to the drawings in detail, in the photographic camera with exchangeable objective, illustrated in Figure 1, reference symbol 1 denotes camera body 1, provided with rotary knob 2, which serves for adjustment of the objective, as well as the adjustment of the range finder. Movement of knob 2 is transmitted to the objective over tube 3. The latter is connected with a tubular slide 4, which is displaceably arranged between objective tube 9 and lens carrier 7. Objective tube 9 can be attached to camera 1 by bayonet connection 5, and is closed by threaded ring 10, behind which a spring 6 is arranged. Ring 10 has a tubular projecting part 23 and the latter holds lens carrier 7, which is displaceable in the direction of picture taking. Lens carrier 7 has a radial, outwardly extending flange 20. Plane surface 17 of said flange 20, annular bevelled surface 19 of tube 9 and inclined surface 14 of tubular slide 4, are held in engagement with balls 8, under the action of spring 6.

The device shown in Figure 1 operates as follows.

Spring 6 permanently urges mount of the objective, i. e. lens carrier 7, toward the camera. Balls 8 located between flange 20 and inclined suface 19 are thereby forced toward the optical axis and they are particularly held in permanent engagement with inclined surface 14 of tubular slide 4. Upon turning knob 2, arranged on camera body 1, for sharp focusing of the objective, tube 3 is caused to move in the direction of the arrow, i. e. in the direction of the optical axis, over conventional transmission elements not shown in the drawing. A similar movement is carried out by tubular slide 4, which presses balls 8, by means of its inclined surface 14 into the wedge-shaped gap between flange 20 and inclined surface 19 of the tube. Thereby, balls 8 slide on inclined surfaces 14 and 19, press against flange 20 in the direction of displacement, and thus bring about displacement corresponding to the inclination of surfaces 14 and 19, of lens carrier 7 against the action of spring 6. Upon turning back rotary knob 2, the effect of spring 6 causes the return of the parts to their initial position.

What is claimed is:

Device for the adjustment of lenses of optical and photographic apparatus, said device comprising in combination a lens tube releasably connected with the apparatus and provided with an interior annular bevelled surface; a mounting member for the lenses, which is housed by said tube, is displaceable in the direction of the optical axis and has a surface extending perpendicularly to the optical axis; a tubular slide member being arranged displaceably in the direction of the optical axis and provided with an inclined annular surface, between said mounting member and said tube; balls enclosed in an annular space which is defined by said annular bevelled surface of the lens tube, said perpendicularly extending surface of the mounting member and the inclined annular surface of the tubular slide member; said surfaces approximating a triangle; means for elastically urging the lens mounting member in the direction of said apparatus, and thereby urging said ball against said surfaces; adjusting means provided in said apparatus for acting on the tubular slide member and causing, by means of the balls and said perpendicularly extending surface, displacement of the lens mounting member in the direction of the optical axis.

References Cited in the file of this patent

UNITED STATES PATENTS

| 2,313,567 | Mihalyi | Mar. 9, 1943 |

FOREIGN PATENTS

| 264,426 | Germany | Sept. 24, 1913 |
| 1,014,069 | France | May 21, 1952 |